(12) United States Patent
Sugimoto

(10) Patent No.: US 7,604,310 B2
(45) Date of Patent: Oct. 20, 2009

(54) INKJET RECORDING APPARATUS AND INKJET RECORDING METHOD

(75) Inventor: Noriko Sugimoto, Konan (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 299 days.

(21) Appl. No.: 11/491,101

(22) Filed: Jul. 24, 2006

(65) Prior Publication Data

US 2007/0019011 A1 Jan. 25, 2007

(30) Foreign Application Priority Data

Jul. 25, 2005 (JP) .............................. 2005-213689

(51) Int. Cl.
 *B41J 2/195* (2006.01)
(52) U.S. Cl. ........................................... 347/7; 347/19
(58) Field of Classification Search ...................... None
 See application file for complete search history.

(56) References Cited

U.S. PATENT DOCUMENTS

| 5,604,597 | A  | * | 2/1997  | Imai .......................... 358/296 |
| 6,290,330 | B1 | * | 9/2001  | Torpey et al. .................. 347/43 |
| 6,336,705 | B1 | * | 1/2002  | Torigoe ........................ 347/43 |
| 6,616,255 | B2 |   | 9/2003  | Murakami et al. |
| 2002/0036687 | A1 |   | 3/2002  | Koitabashi |
| 2002/0180815 | A1 | * | 12/2002 | Nou ............................ 347/10 |
| 2005/0068349 | A1 | * | 3/2005  | Matsumoto et al. ............ 347/7 |

FOREIGN PATENT DOCUMENTS

| EP | 0925919 A2 | 6/1999 |
| JP | 2002 113850 | 4/2002 |

OTHER PUBLICATIONS

European Patent Office, Extended European Search Report for Related EP Application No. 06015484 dated Dec. 14, 2006.

* cited by examiner

*Primary Examiner*—Matthew Luu
*Assistant Examiner*—Justin Seo
(74) *Attorney, Agent, or Firm*—Baker Botts L.L.P.

(57) ABSTRACT

There is disclosed a method for recording a solidly filled portion in an image using an inkjet recording apparatus. The method includes: recording an outline of the solidly filled portion with a first ink of a first color, recording at least one first area of the solidly filled portion on an inner side of the outline with a second ink of the first color, and recording at least one second area of the solidly filled portion on the inner side of the outline with a third ink of a second color which is brighter than the first color, at least a part of the second area overlapping the first area.

17 Claims, 9 Drawing Sheets

INKJET RECORDING APPARATUS AND INKJET RECORDING METHOD

INCORPORATION BY REFERENCE

The present application is based on Japanese Patent Application No. 2005-213689, filed on Jul. 25, 2005, the contents of which are incorporated herein by reference.

BACKGROUND OF THE INVENTION

1. Field of the Invention

The present invention relates to an inkjet recording method and an inkjet recording-apparatus.

2. Description of Related Art

An inkjet recording apparatus is disclosed for instance in JP-A-2002-113850, according to which an edge or an outline of a black portion in an image as an object to record on a recording medium is printed or recorded with a black pigmented ink, and the rest of the black portion, or an inner side of the outline thereof, is recorded with a combination of the black pigmented ink and a black dye ink or solely with the black dye ink. That is, the outline of the black portion is sharpened by printing the outline with a pigmented ink that is less penetrative or permeative with respect to the recording medium than a dye ink, while it is ensured that the inner side of the outline that is desired to be printed all black is excellently printed black in a desired print density, by printing the inner side with a combination of a pigmented ink and a dye ink which is more penetrative or permeative with respect to the recording medium than a pigmented ink, or solely with a dye ink.

According to the known inkjet recording apparatus, a plurality of inks including the black pigmented ink and the black dye ink are used to enable color printing. However, when a black portion included in an image is printed, only the black inks are consumed in great amounts, and thus the black inks deplete before the other inks do. That is, the inks accommodated in respective ink tanks or ink cartridges are nonuniformly consumed, whereby a user is forced to frequently replace an exhausted ink tank or ink cartridge with a new one.

SUMMARY OF THE INVENTION

This invention has been developed in view of the above-described situations, and it is an object of the invention to provide an inkjet recording method and an inkjet recording apparatus which can record an image using a plurality of inks of respective colors such that the inks are consumed as uniformly as possible, while minimizing a difference in a color tone between a desired image and an actually recorded image.

To attain the above object, the invention provides A method for recording a solidly filled portion in an image using an inkjet recording apparatus, the method including: recording an outline of the solidly filled portion with a first ink of a first color; recording at least one first area of the solidly filled portion on an inner side of the outline with a second ink of the first color; and recording at least one second area of the solidly filled portion on the inner side of the outline with a third ink of a second color which is brighter than the first color, at least a part of the second area overlapping the first area.

With the second area at least partially overlapping the first area, the inner side of the outline of the solidly filled portion is recorded using the third ink of the second color brighter than the color of the second ink, except the first area recorded using the second ink of the first color in general, when a sub-dot is formed with a brighter ink at a position in a recording medium to at least partially overlap a dot formed with a darker ink, a mixture of the darker ink and the brighter ink permeates the recording medium and spreads beyond the darker dot to an area around the darker dot. Hence, according to the invention, as long as the second color is brighter than the first color, a color tone of the inner area of the solidly filled portion becomes almost a color tone of the second ink, namely, the first color, while ink consumption is made relatively uniform among the first, second and third inks, equalizing the remaining amounts thereof. That is, the color tone of the inner area of the solidly filled portion is scarcely affected by using the third ink of the second color in recording the inner area, and if any, the influence is so subtle that the influence is undetectable with the naked human eye.

The invention further provides an inkjet recording apparatus which records an outline of a solidly filled portion in an image with a first ink of a first color, at least one first area on the inner side of the outline with a second ink of the first color, and at least one second area on the inner side of the outline with a third ink of a second color brighter than the first color.

According to this apparatus, the same effect as described above with respect to the method according to the invention can be obtained.

BRIEF DESCRIPTION OF THE DRAWINGS

The above and other objects, features, advantages and technical and industrial significance of the present invention will be better understood by reading the following detailed description of preferred embodiments of the invention, when considered in connection with the accompanying drawings, in which.

DETAILED DESCRIPTION OF PREFERRED EMBODIMENTS

Hereinafter, there will be described several presently preferred embodiments of the invention, by referring to the accompanying drawings.

First Embodiment

Figure 1:
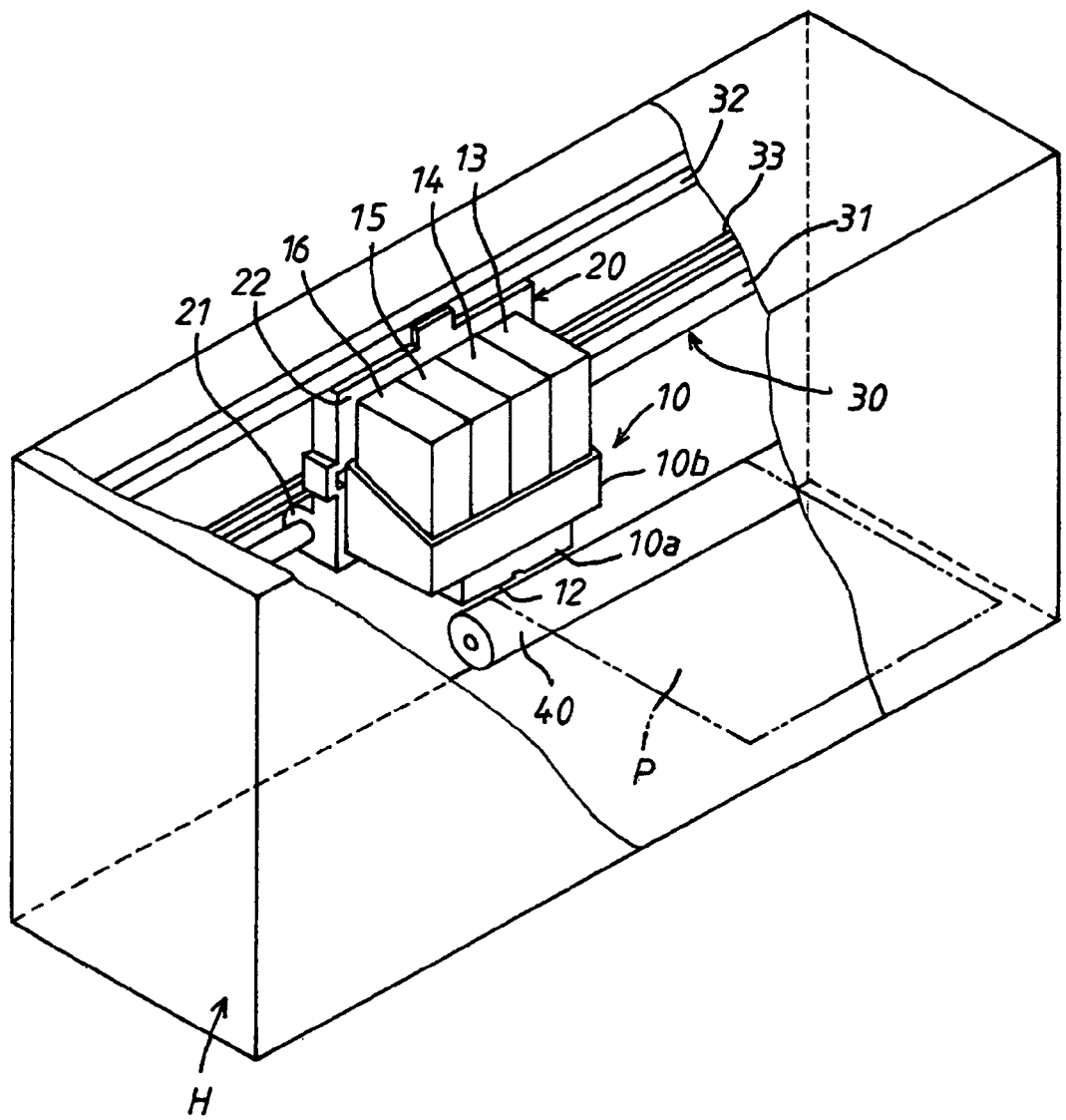
FIG. 1 is a fragmentary perspective view schematically showing an inkjet recording apparatus according to a first embodiment of the invention.
Figure 2:
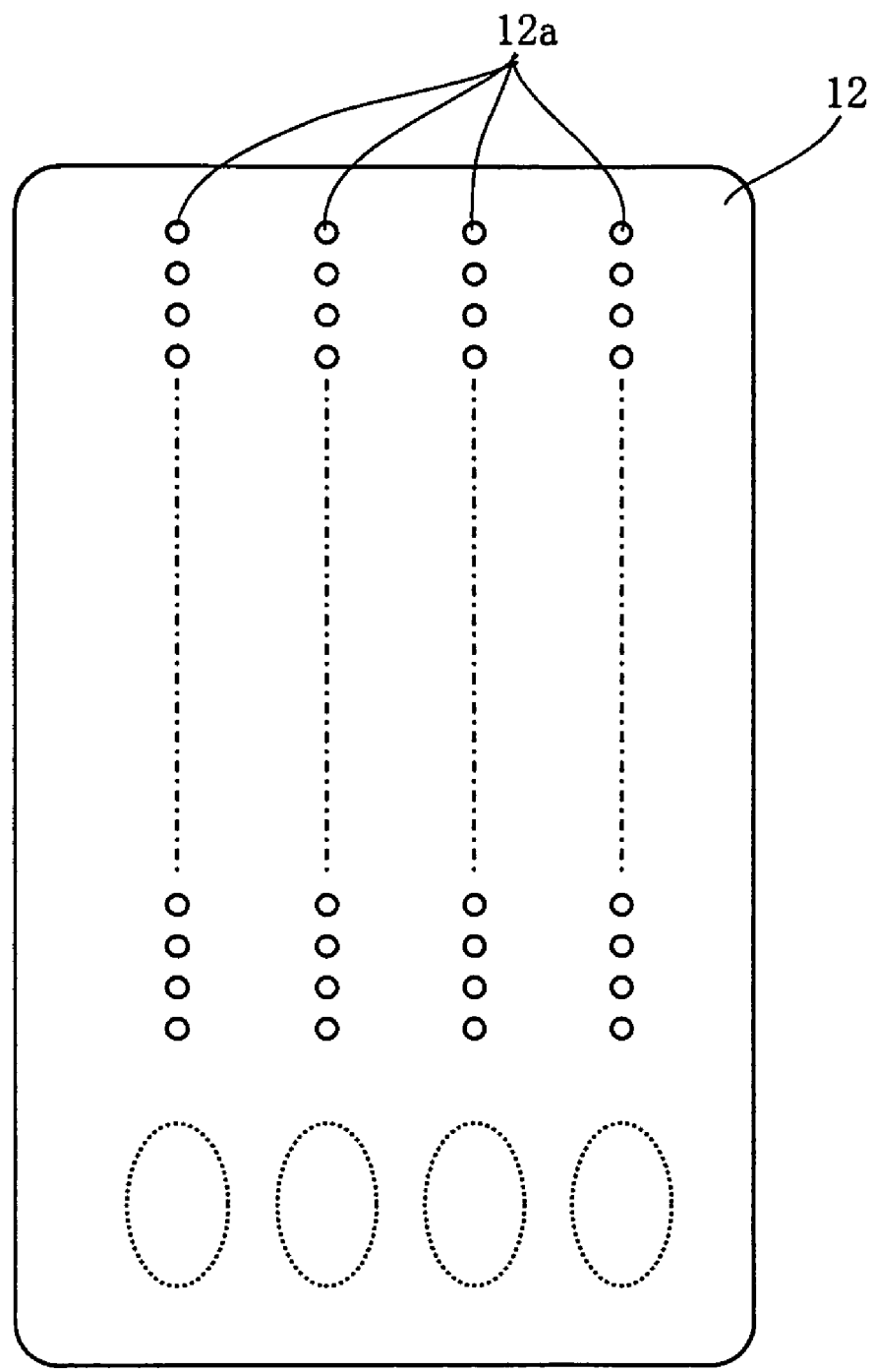
FIG. 2 is a bottom view of an inkjet head of the inkjet recording apparatus.

There will be described an inkjet recording apparatus according to a first embodiment of the invention, with reference to FIGS. 1-5. As shown in FIG. 1, which is a schematic perspective view of the inkjet recording apparatus, the inkjet recording apparatus includes a housing H and a head unit 10 disposed in the housing H. The head unit 10 is supported by a driving unit 30 via a plate-like carriage 20 such that the head unit 10 is movable in a lateral direction as seen in FIG. 1.

The head unit 10 includes an accommodating box 10b and an inkjet head 10a disposed under the accommodating box 10b.

As shown in FIG. 1, the inkjet head 10a is a rectangular parallelepiped. A bottom wall of the inkjet head 10a is constituted by a nozzle plate 12 in which nozzles 12a (shown in FIG. 2), from which ink droplets are ejected, are arranged in four rows each for a specific ink, as described later. A plurality of ink chambers (not shown) are formed in the inkjet head 10a so as to correspond to each nozzle row.

The inkjet head 10a has actuators (not shown) such as piezoelectric elements. Each of the actuators is configured to eject the ink in one of the ink chambers to the exterior of the inkjet head 10a, from a corresponding nozzle.

The accommodating box 10b of the head unit 10 is open on its upper side and accommodates or supports a cyan ink cartridge 13, a magenta ink cartridge 14, an yellow ink cartridge 15 and a black ink cartridge 16.

In the first embodiment, each of the cyan ink cartridge 13, the magenta ink cartridge 14, the yellow ink cartridge 15 and the black ink cartridge 16 has an ink hole (not shown) formed through a bottom wall thereof, so that the ink cartridges 13-16 are in ink communication with the respectively corresponding ink chambers in the inkjet head 10a, via the ink holes (not shown).

The cyan ink cartridge 13 stores a cyan ink, the magenta ink cartridge 14 stores a magenta ink, and the yellow ink cartridge 15 stores an yellow ink. Each of the cyan, magenta and yellow inks is a dye ink. The cyan, magenta and yellow inks correspond to a third ink.

The black ink cartridge 16 stores a black pigmented ink that corresponds to a first ink and a second ink. Each of the dye inks is more penetrative or permeative with respect to a recording medium P (shown in FIG. 1) as an object on which an image is to be recorded, than the black pigmented ink.

At its lower portion 21, the carriage 20 is fitted on a carriage rod 31 of the driving unit 30 such that the carriage 20 is slidable along the carriage rod 31. An upper portion 22 of the carriage 20 is in contact with and guided by a guide rod 32 of the driving unit 30.

In addition to the carriage rod 31 and the guide rod 32, the driving unit 30 includes an endless belt 33 as shown in FIG. 1.

The carriage rod 31 is supported in the housing H and extends in a lateral direction as seen in FIG. 1. The endless belt 33 is wound around a pair of pulleys (not shown) rotatably supported at opposite ends of the carriage rod 31. The carriage 20 is coupled, at a middle portion of its back side, with the endless belt 33. One of the two pulleys is supported by an output shaft of a carriage motor (not shown) coaxially.

The driving unit 30 is configured such that with rotation of the carriage motor in a forward and a reverse direction, the pulleys rotate and the endless belt 33 circulates, thereby reciprocating the carriage 20 along the carriage rod 31. In this embodiment, an axial direction of the guide rod 32 corresponds to a main scanning direction.

A platen roller 40 is rotatably supported by a suitable stationery member (not shown) in the housing H, such that the platen roller 40 extends parallel to the carriage rod 31. The platen roller 40 is disposed such that the platen roller 40 can be positioned under the nozzle plate 12 of the inkjet head 10a.

The recording medium P is supplied, by a medium feeding unit (not shown), to a position between the nozzle plate 12 of the inkjet head 10 and the platen roller 40, and fed in a direction perpendicular to an axis of the platen roller 40 by rotation of the platen roller 40. The direction in which the recording medium P is fed will be hereinafter referred to as "auxiliary direction".

Figure 3:
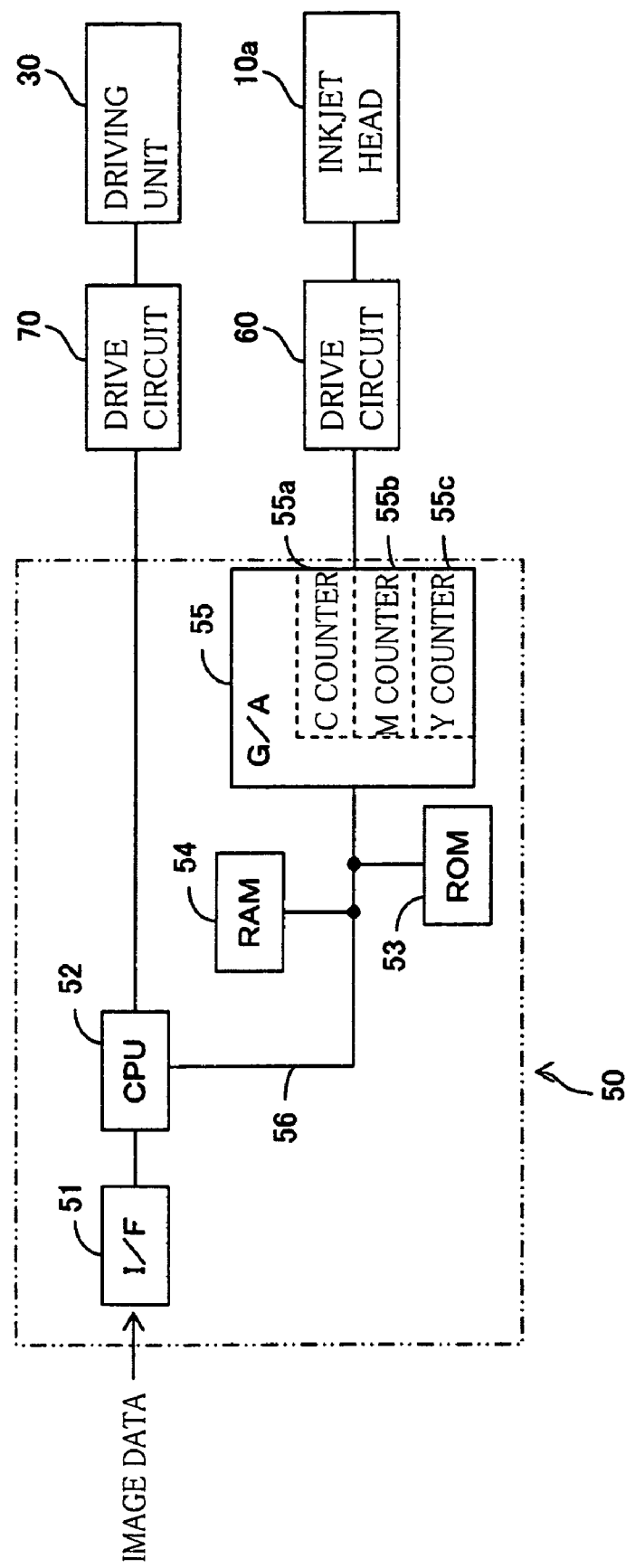
FIG. 3 is a block diagram of an electrical circuit in the inkjet recording apparatus.

As shown in FIG. 3, the inkjet recording apparatus includes a control unit 50 including an interface (I/F) 51. The control unit 50 further includes a CPU 52, a ROM 53, a RAM 54 and a gate array (G/A) 55 that are connected to one another via a bus line 56.

The CPU 52 of the control unit 50 operates to implement various kinds of processing including recording processing. The recording processing is implemented according to a program stored in the ROM 53 and illustrated in FIG. 4.

Based on a print timing signal received from the CPU 52 via the bus line 56, the G/A 55 outputs recording data instructing ejection of a droplet of one of the inks, along with an ejection timing signal, to the inkjet head 10a via a drive circuit 60. Printing of each dot in an image as represented by image data is performed according to one or more pieces of the recording data, and a manner of the recording of the dot depends on the position of the dot in each solidly filled portion which the dot constitutes, as described later.

The G/A 55 includes a cyan dot counter 55a (hereinafter referred to as "C counter 55a"), a magenta dot counter 55b (hereinafter referred to as "M counter 55b") and a yellow dot counter 55c (hereinafter referred to as "Y counter 55c").

The C counter 55a counts the number of times droplets of the cyan ink are ejected, as a count C. The M counter 55b counts the number of times droplets of the magenta ink are ejected, as a count M. The Y counter 55c counts the number of times droplets of the yellow ink are ejected, as a count Y. The counting by each of the C counter 55a, M counter 55b and Y counter 55c is implemented based on the recording data outputted from the G/A 55.

Each of the C counter 55a, the M counter 55b and the Y counter 55c is configured to reset its count C, M, Y when the corresponding ink cartridge 13-15 is replaced to a new one due to depletion of the ink therein.

The drive circuit 60 is controlled by the G/A 55 to output a drive pulse signal to each of the actuators so that the ink in the ink chamber in the inkjet head 10a is ejected from the nozzle. A drive circuit 70 is controlled by the CPU 52 to drive the driving unit 30.

Figure 4:
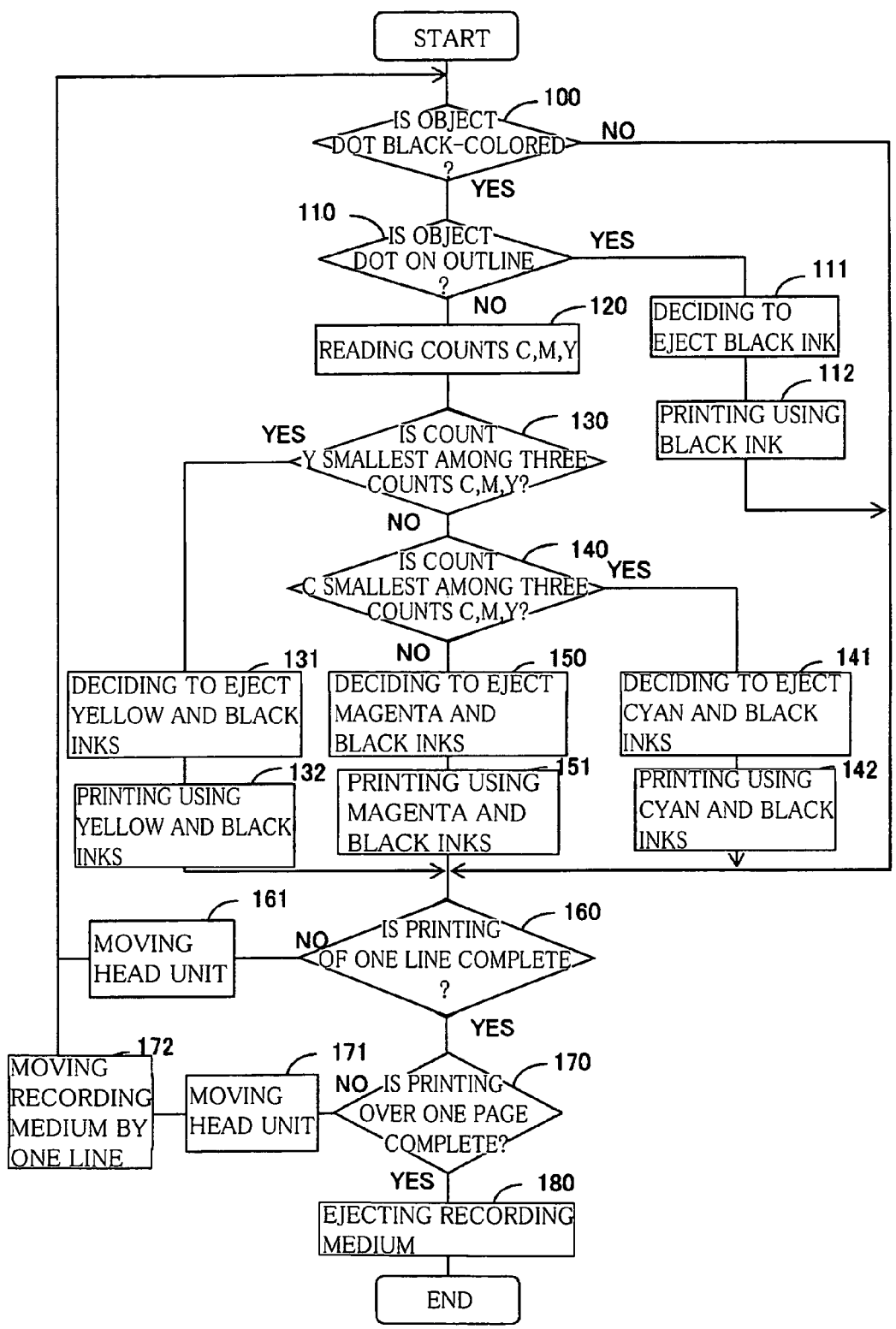
FIG. 4 is a flowchart illustrating recording processing implemented by a CPU shown in FIG. 3.

When the inkjet recording apparatus is operated, the CPU 52 executes processing according to the program illustrated as a flowchart in FIG. 4, after initial processing has been implemented.

The initial processing is implemented as follows. When recording is to be performed, the CPU 52 initially controls the driving unit 30 via the drive circuit 70 to move the head unit 10 with the carriage 20 to a predetermined position, and controls the medium feeding unit to feed the recording medium P to a predetermined position in order to introduce the recording medium P between the nozzle plate 12 of the inkjet head 10a and the platen roller 40. The CPU 52 also operates to have the RAM 54 store the image data transferred from an external circuit via the I/F 51 and the bus line 56. The image data includes a large number of pieces of dot data F1, F2 (shown in FIG. 5). The dot data F1 is data of a dot on an outline of a solidly filled portion F, which is in this embodiment a black portion, in an image to be recorded on the recording medium P, and the dot data F2 is data of a dot on the inner side of the outline of the solidly filled portion or solid black portion F.

When the initial processing is complete, the processing flow begins at step 100 in which the CPU 52 determines, based on the image data from the RAM 54, whether a dot to be printed in a recording area in the recording medium P is a black-colored dot. Hereinafter, a dot currently in question will be referred to as "object dot".

When the object dot is not a black-colored dot, the CPU 52 makes a negative decision NO in step 100. On the other hand, when the CPU 52 makes an affirmative decision YES in step 100, i.e., when it is determined that the object dot is a black-colored dot, the processing flow goes to step 110 in which the CPU 52 determines based on the image data whether the object dot is on the outline of the solid black portion F.

When it is determined that the object dot is a dot F1 on the outline of the solid black portion F, an affirmative decision YES is made in step 110 and the processing flow goes to step 111 to decide that the ink a droplet of which is to be ejected is the black ink.

Then, in the following step 112, recording with the black ink is implemented. That is, the G/A 55 outputs, to the drive circuit 60 and based on the print timing signal outputted from the CPU 52 via the bus line 56, the ejection timing signal and a first sort of the recording data which instructs to eject a droplet of the black ink, namely, to form the object dot with the black ink only, since in this case the object dot is on the outline of the solid black portion F.

Accordingly, the black ink in the black ink cartridge 16 (first ink) is ejected from the corresponding nozzle of the inkjet head 10a onto the recording medium P in the recording area thereof and at a recording position corresponding to the outline. In this way, at the recording position in the recording medium P a black dot is formed using the black ink.

As mentioned above, the black ink is a pigmented ink and less penetrative or permeative than dye inks. Hence, a black-colored dot with high sharpness is formed at the recording position in the recording medium P.

On the other hand, when it is determined based on the image data that the object dot is a dot F2 on the inner side of the outline of the solid black portion F, a negative decision NO is made in step 110.

In this case, the processing flow goes to step 120 to read out the counts C, M, Y More specifically, the current values of the count C, the count M and the count Y are read from the C counter 55a, the M counter 55b and the Y counter 55c in the G/A 55, respectively.

Then, in the following step 130, it is determined whether the count Y is the smallest among the three counts, C, M and Y read out in step 120. When it is determined that the count Y is currently the smallest among the three counts, this means that the yellow ink is the greatest in the remaining amount among the cyan, magenta and yellow inks. In this case, an affirmative decision YES is made in step 130.

Then, the processing flow goes to step 131 in which it is decided that recording is to be performed using the yellow ink (third ink) and the black ink (second ink). The processing flow then goes to step 132 to perform recording using the yellow and black inks.

More specifically, according to the decision made in step 131, the G/A 55 outputs, to the drive circuit 60 and based on the print timing signal outputted from the CPU 52, the ejection timing signal and the sort of the recording data which instructs to eject a droplet of the black ink and a second sort of the recording data which instructs to eject a droplet of the yellow ink. Namely, it is instructed to form the object dot with a droplet of the black ink and a droplet of the yellow ink, since in this case the object dot is positioned on the inner side of the outline of the solid black portion F and the remaining amount of the yellow ink is the greatest among the yellow, magenta and cyan inks.

Thus, the drive circuit 60 is controlled by the G/A 55 based on the first and second sorts of the recording data instructing recording using the black and yellow inks, and the ejection timing signal. Accordingly, the black ink in the black ink cartridge 16 and the yellow ink in the yellow ink cartridge 15 are supplied from the relevant two ink chambers to be sequentially ejected from the corresponding two nozzles of the inkjet head 10a onto the recording medium P at the recording position on the inner side of the outline of the solid black portion F.

Figure 5:
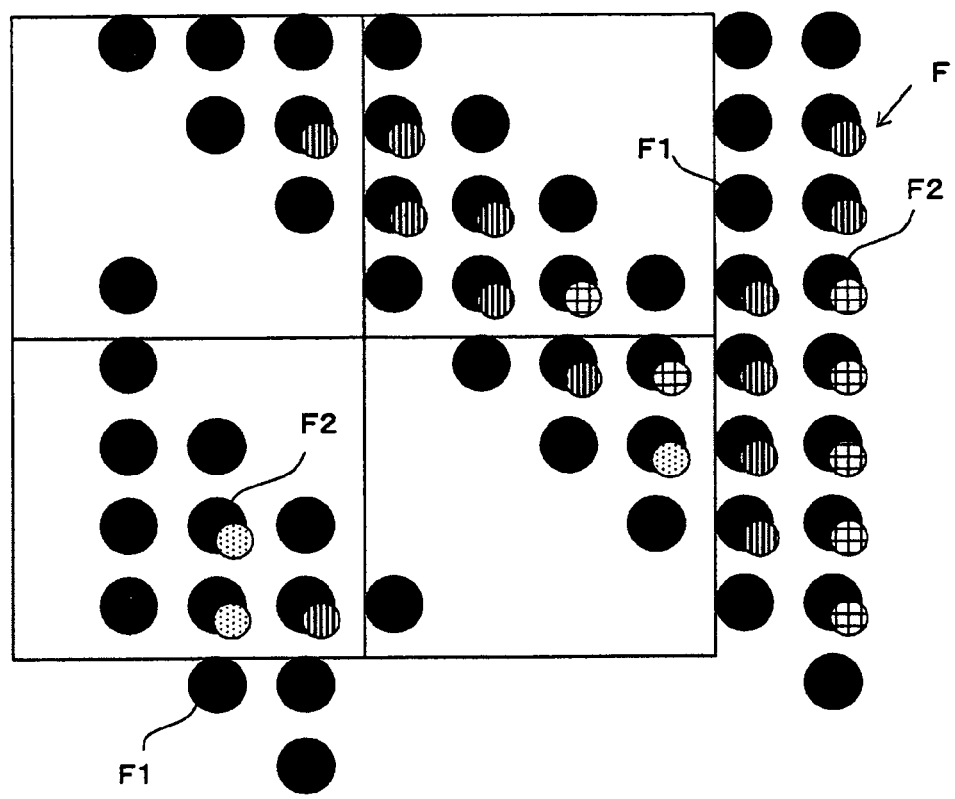
FIG. 5 schematically illustrates a portion of an image represented by image data stored in a RAM shown in FIG. 3.

In this way, a droplet of the black ink and a droplet of the yellow ink are ejected in series onto the recording medium P at a substantially same recording position that is on the inner side of the outline of the solid black portion F. That is, at the recording position on the inner side of the outline, a black dot is first printed, and then a yellow dot is printed. A dot thus formed at the recording position on the inner side of the outline is illustrated in FIG. 5 in such a form that a circle with vertical stripes overlaps a solid black circle.

As described above, the black ink is less permeative or penetrative with respect to the recording medium P. Hence, the black dot formed at the recording position on the inner side of the outline does not much grow or the ink forming the black dot does not much spread. On the other hand, the yellow ink is so permeative or penetrative that the yellow dot formed at the substantially same recording position as the black dot grows or spreads beyond the black dot to an area around the black dot. For convenience of presentation, the yellow dot represented in FIG. 5 as a circle with vertical stripes is not exactly coincident with the black dot in position. That is, a center of the yellow dot is located at a lower right position with respect to a center of the black dot in FIG. 4. However, the form or mode of the dot where the yellow dot is printed to overlap the black dot is not limited thereto. The yellow dot may be alternatively printed at the exactly same position as the black dot such that the centers of the yellow and black dots coincide. In this case, the yellow dot spreads or grows to an area around the black dot, for example, to the lower right position with respect to the black dot such that the yellow dot partially overlaps the black dot. It is also noted that although in FIG. 5 are shown cyan dots and magenta dots (described later) as well as the yellow dots, this is only for convenience of illustration, and actually dots of only one of the three colors other than black, the count C, M or Y of which one color is the smallest among the three colors, are printed, according to this embodiment, as can be seen from the flowchart of FIG. 4.

Since the yellow dot is brighter in color than the black dot, the dot formed at the recording position on the inner side of the outline eventually becomes a larger black dot, while a color tone of the black color of the black dot formed before the yellow dot is not substantially affected by the yellow color of the later printed yellow dot.

When the G/A 55 receives the first and second sorts of the recording data instructing to eject a droplet of the black ink and the yellow ink, the Y counter 55c of the G/A 55 responds to the recording data instructing to eject a droplet of the yellow ink, namely, increments its count (i.e., the count Y) by one.

Referring back to the flowchart of FIG. 4, when it is determined in step 130 that the count Y is not the smallest among the three counts C, M, Y. i.e., when a negative decision NO is made in step 130, the processing flow goes to step 140 in which it is determined whether the count C is the smallest among the counts C, M, Y.

When it is determined in step 140 that the count C is the smallest among the counts C, M, Y, this means that the cyan ink is the greatest among the cyan, magenta and yellow inks in the remaining amount, and an affirmative decision YES is made in step 140. The processing flow then goes to step 141 in which it is decided that recording is to be performed using the cyan ink (third ink) and the black ink (second ink).

The processing flow then goes to step 142 to perform recording with the cyan and black inks. More specifically, the G/A 55 outputs, to the drive circuit 60 and based on the print timing signal outputted from the CPU 52, the ejection timing signal and the first sort of the recording data instructing to eject a droplet of the black ink and a third sort of the recording data instructing to eject a droplet of the cyan ink, namely, to form the object dot with a droplet of the black ink and a droplet of the cyan ink, since in this case the object dot is positioned on the inner side of the outline of the solid black portion F and the remaining amount of the cyan ink is the greatest among the yellow, cyan and magenta inks.

Thus, similar to the processing of step 132, a droplet of the black ink and a droplet of the cyan ink are ejected in series onto the recording medium P at a substantially same recording position on the inner side of the outline of the solid black portion F. That is, at the recording position on the inner side of the outline, a black dot is first printed, and then a cyan dot is printed. A dot formed by thus printing the cyan dot to at least partially overlap the previously printed black dot at the recording position on the inner side of the outline is illustrated in FIG. 5 in such a form that a circle with a lattice pattern overlaps a solid black circle.

Since the black ink is less permeative or penetrative with respect to the recording medium P, as described above, the black dot printed at the recording position on the inner side of the outline does not spread or grow. However, the cyan ink is so permeative or penetrative that cyan dot formed at the substantially same recording position as the previously printed black dot spreads or grows beyond the black dot to an area around the black dot, in the same way as the above-described case where a yellow dot is printed to at least partially overlap a previously printed black dot. Since the cyan dot is brighter in color than the black dot, the dot formed by first printing the black dot and then printing the cyan dot at the recording position on the inner side of the outline eventually becomes a larger black dot, while the color tone of the black color of the first printed black dot is not substantially affected by the cyan color of the later printed cyan dot.

When the G/A 55 receives the first and third sorts of the recording data instructing to eject a droplet of the black ink and a droplet of the cyan ink, the C counter 55a of the G/A 55 responds to the recording data instructing to eject a droplet of the cyan ink, namely, increments its count (i.e., the count C) by one.

In the above-described step 140, when it is determined that the count C is not the smallest among the three counts C, M, Y read out in step 120, i.e., when a negative decision NO is made in step 120, this means that the count M is the smallest among the counts C, M, Y and that the magenta ink is the greatest in the remaining amount among the three inks other than the black ink.

In this case, the processing flow goes to step 150 in which it is decided that printing is to be performed using the magenta ink (third ink) and the black ink (second ink) is implemented. The processing flow then goes to step 151 to perform printing with the magenta and black inks.

More specifically, the G/A 55 outputs, to the drive circuit 60 and based on the print timing signal outputted from the CPU 52, the ejection timing signal and the first sort of the recording data instructing to eject a droplet of the black ink and a fourth sort of the recording data instructing to eject a droplet of the magenta ink, namely, to form the object dot with a droplet of the black ink and a droplet of the magenta ink, since in this case the object dot is positioned on the inner side of the outline of the solid black portion F and the remaining amount of the magenta ink is the greatest among the yellow, cyan and magenta inks.

Thus, similar to the processing of step 132, a droplet of the black ink and a droplet of the magenta ink are ejected in series onto the recording medium P at a substantially same recording position that is on the inner side of the outline of the solid black portion F. That is, at the recording position on the inner side of the outline, a black dot is first printed, and then a magenta dot is printed. A dot thus formed by first printing the black dot and then printing the magenta dot at the recording position on the inner side of the outline is shown in FIG. 5 in such a form that a circle with fine dots overlaps a solid black circle.

Since the black ink is less permeative or penetrative with respect to the recording medium P, as described above, the black dot printed at the recording position on the inner side of the outline does not grow or spread. However, the magenta ink is so permeative or penetrative that magenta dot printed at the substantially same recording position as the black dot grows or spreads-beyond the black dot to an area around the black dot, in the same way as the above-described case where the yellow or cyan dot is printed to overlap the black dot. Since the magenta dot is brighter in color than the black dot, the dot formed by first printing the black dot and then printing the magenta dot to at least partially overlap the black dot at the recording position on the inner side of the outline eventually becomes a larger black dot, while the color tone of the black color of the black dot is not substantially affected by the magenta color of the magenta dot.

When the G/A 55 receives the first and fourth sorts of the recording data instructing to eject a droplet of the black ink and a droplet of the magenta ink, the M counter 55b of the G/A 55 responds to the recording data instructing to eject the droplet of the magenta ink, namely, increments its count (i.e., the count M) by one.

When the processing of any of steps 132, 142 and 151 is complete, the processing flow goes to step 160 to determine whether printing of one line on the recording medium P is complete. When printing of one line is not yet complete, a negative decision NO is made in step 160.

Then, the processing flow goes to step 161 to move the head unit 10. Namely, the driving unit 30 is driven by the drive circuit 70 to move the head unit 10 in the main scanning direction by an amount corresponding to one dot. That is, the object dot, which is a dot for which the determination of step 100 is made, is shifted from the dot at the recording position repeatedly mentioned above, to another dot at a recording position next or adjacent to the above-mentioned recording position.

Then, a dot is formed at the adjacent recording position in the same way as described above, namely, processing along steps 100-112, -132, -142 or -151 is repeated for the adjacent recording position, so that a droplet of the black ink, droplets of the black and yellow inks, droplets of the black and cyan inks, or droplets of the black and magenta inks, is/are ejected.

Thereafter, when an affirmative decision YES is made in step 160, the processing flow goes to step 170 to determine whether printing over one page is complete. When it is determined that printing over one page is not complete, a negative decision NO is made in step 170.

In this case, the processing flow goes to step 171 to move the head unit 10. Namely, the head unit 10 is moved to its leftmost position in the main scanning direction by the driving unit 30 driven by the drive circuit 70. The processing flow then goes to step 172 to implement line-feed processing. Namely, the recording medium P is fed in the auxiliary direction by an amount corresponding to one line, by the medium feeding unit, in order to print the second line in the recording medium P. More specifically, printing of a dot at a first recording position in the second line is implemented by repeating the processing of step 100 and the following steps described above, that is, by ejecting a droplet of the black ink, droplets of the black and yellow inks, droplets of the black and cyan inks, or droplets of the black and magenta inks.

Thereafter, when an affirmative decision YES is made in step 170, the processing flow goes to step 180 to eject the recording medium P. Namely, the recording medium P is ejected by the medium feeding unit out of the inkjet recording apparatus.

According to the above-described inkjet recording apparatus, the inner side of the outline of the solid black portion F is printed black using one of the following combinations (i)-(iii): (i) the black ink and the cyan ink; (ii) the black ink and the magenta ink; and (iii) the black ink and the yellow ink. The black ink in each combination is less permeative or penetrative with respect to the recording medium P, and the cyan ink, the magenta ink and the yellow ink are relatively permeative or penetrative.

Hence, when a droplet of the cyan ink, the magenta ink or the yellow ink is ejected onto the recording medium P, the dot formed by the cyan, magenta or yellow ink droplet spreads beyond the black dot previously formed with the black ink, to the area around the black dot. Since the cyan, magenta or yellow dot is brighter in color than the black dot, the dot formed by printing the cyan, magenta or yellow dot to at least partially overlap the black dot becomes larger in size and provides an excellent density at the recording position on the inner side of the outline, without changing the color tone of the black dot printed before and under the cyan, magenta or yellow dot, in spite of that the two dots differ in colors.

On the other hand, the outline of the solid black portion F is printed using only the black ink, as described above. Thus, the solid black portion F printed is highly sharp at its outline.

In this way, the image recorded on the recording medium P is such that the outline of the solid black portion F is printed black with high sharpness, and the inner side of the outline of the solid black portion F is printed black uniformly and in an excellent density.

The outline of the solid black portion F is printed using the black pigmented ink, and the inner side of the outline of the solid black portion F is printed by forming dots of the black pigmented ink below the dots of the other inks of brighter colors. Hence, the solid black portion F can be printed in a desired black color without being adversely affected by the use of the ink of a color other than black, namely, cyan, magenta or yellow.

The inner side of the outline is printed using one of the cyan, magenta and yellow inks, of which the remaining amount is the greatest thereamong, as described above. Accordingly, the remaining amount becomes uniform among the cyan, magenta and yellow ink, thereby decreasing the frequency of replacement of an ink cartridge 13-15 of cyan, magenta and yellow with a new one. Further, since the solid black portion F is printed black using the cyan, magenta and yellow inks as well as the black ink, the uniformity in the consumption amount is improved between the black ink and the other inks.

Second Embodiment

Figure 6A:
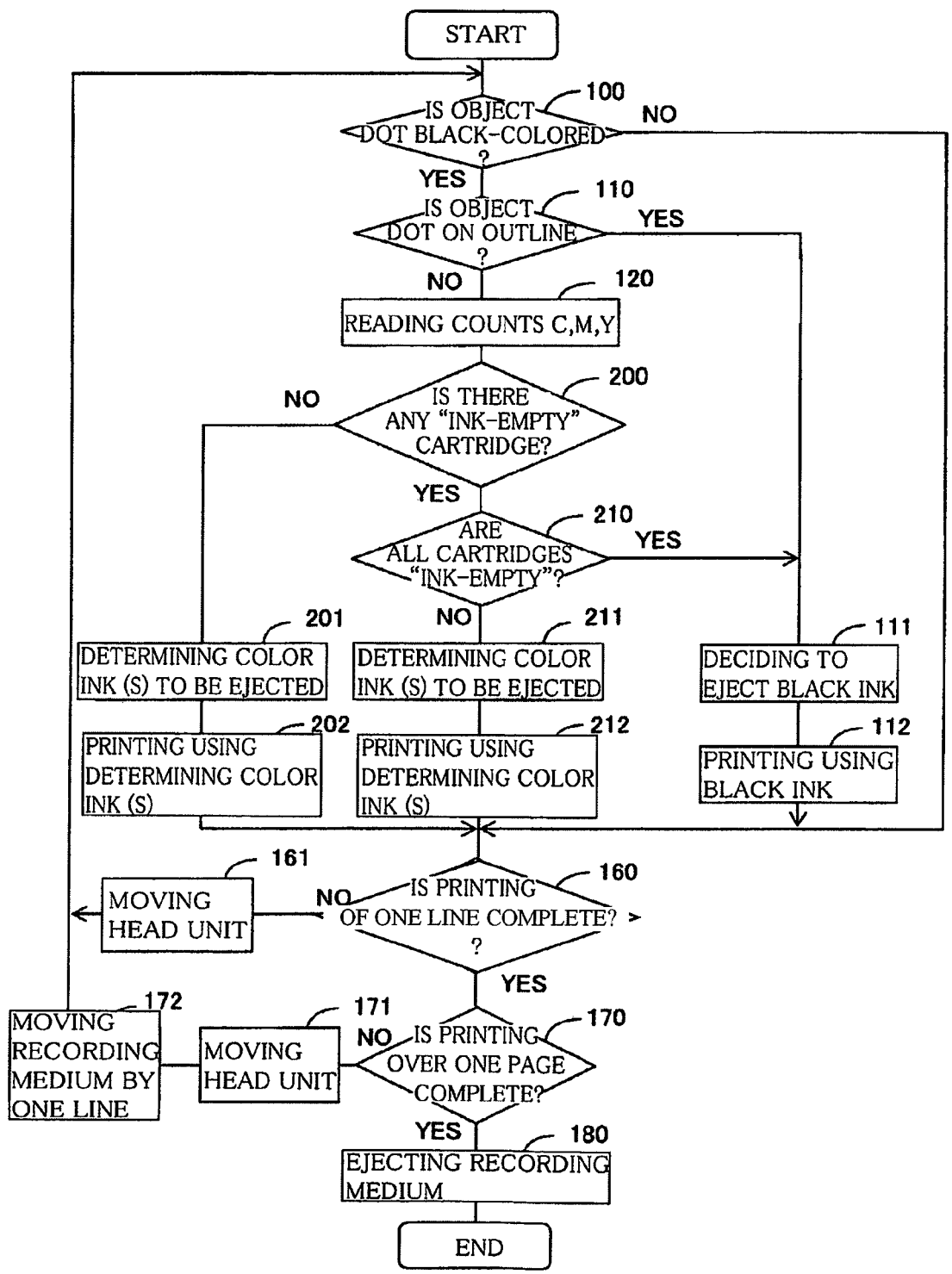
FIG. 6A is a flowchart illustrating recording processing implemented by a CPU in an inkjet recording apparatus according to a second embodiment of the invention.

There will be now described an inkjet recording apparatus according to a second embodiment of the invention, with reference to FIG. 6A illustrating an important part of the inkjet recording apparatus of the second embodiment. The inkjet recording apparatus of the second embodiment differs from that of the first embodiment only in the processing flow of FIG. 4. That is, instead of the flowchart of FIG. 4, the inkjet recording apparatus of the second embodiment implements a recording operation according to a flowchart of FIG. 6A, but the other part of the inkjet recording apparatus of the second embodiment is identical with that of the first embodiment. The parts or elements corresponding to those of the first embodiment will be designated by the same reference numerals or symbols and description thereof is omitted.

When the inkjet recording apparatus of the second embodiment is operated to record an image, a CPU 52 initiates execution of a program according to the flowchart illustrated in FIG. 6A.

In the same way as in the first embodiment, after steps 100 and 110 are implemented, the processing flow goes to step 120 in which counts C, M, Y are read out from a cyan dot counter 55a (or C counter 55a), a magenta dot counter 55b (or M counter 55b) and a yellow dot counter 55c (or Y counter 55c) of a G/A 55.

Then, the processing flow goes to step 200 to determine, based on the counts C, M and Y read in step 120, whether there is any one of a cyan ink cartridge 13, a magenta ink cartridge 14, and an yellow ink cartridge 15 is recognized as an "INK-EMPTY" cartridge. When an amount of an ink remaining in an ink cartridge 13, 14, 15 is less than a predetermined threshold, the ink cartridge is recognized as an "INK-EMPTY" cartridge.

When it is determined that the remaining amounts of the inks in all of the cartridges 13-15 are not less than the predetermined threshold, that is, when there is no "INK-EMPTY" cartridge; a negative decision NO is made in step 200.

In the following step 201, an ink to be used in addition to the black ink is determined. In this step, at least one of a cyan ink, a magenta ink and a yellow ink is determined or selected to be used.

Then, the processing flow goes to step 202 to perform printing using the thus selected ink(s) in addition to the black ink.

That is, the G/A 55 outputs, to a drive circuit 60 and based on a print timing signal outputted from the CPU 52, an ejection timing signal and a first sort of recording data which instructs to eject a droplet of a black ink, and a second sort of recording data which instructs to eject a droplet of one of the at least one selected ink, namely, to form an object dot with a droplet of the black ink and a droplet of one of the at least one ink selected in step 201, since in this case the object dot is positioned on the inner side of an outline of a solid black portion F. When two or three of the cyan, magenta and yellow inks are selected to be used with the black ink in step 201, the two or three inks are used according to a predetermined rule. For instance, all of the cyan, magenta and yellow inks are selected in step 201 to be used such that the numbers of dots formed using the cyan, magenta and yellow inks, respectively, are predetermined based on a history of use of the cyan, magenta and yellow inks. For example, dots using the cyan ink along with the black ink are first printed in the predetermined number, then dots using the magenta ink along with the black ink are printed in the predetermined number, and at last dots using the yellow ink along with the black ink are printed in the predetermined number. Further, the numbers of the dots formed using the cyan, magenta and yellow inks, respectively, may be the same. Alternatively, the predetermined rule may be that described later with respect to a third embodiment of the invention. Although it is usual that each black-colored dot on the inner side of the outline is formed by first printing a black dot and then printing one dot of another color to at least partially overlap the black dot, the way of using the at least one selected ink is not limited thereto.

Thus, a droplet of the black ink supplied from a black ink cartridge 16 to an ink chamber in an inkjet head 10*a* is first ejected onto the recording medium P at a recording position that is on the inner side of the outline, and then a droplet of one of at least one selected ink supplied from a cyan ink cartridge 13, a magenta ink cartridge 14 or an yellow ink cartridge 15 to an ink chamber in the inkjet head 10*a* is ejected onto the recording medium P at the substantially same recording position as the droplet of the black ink. That is, a droplet of the black ink and a droplet of one of at least one selected ink are ejected in series at the recording position on the inner side of the outline of the solid black portion F.

When the G/A 55 receives the first sort of recording data instructing printing with the black ink and the second sort of the recording data instructing printing with one of at least one selected ink, a relevant one of the C counter 55*a*, the M counter 55*b* and the Y counter 55*c* responds to the received second sort of recording data, namely, increments its count by one. For instance, when the second sort of recording data instructs to eject a droplet of the cyan ink, the C counter 55*a* is relevant and increments its count C by one.

In the above-described step 200, when it is determined that there is an ink cartridge recognized as "INK-EMPTY", an affirmative decision YES is made and the processing flow goes to step 210 to determine whether all of the three ink cartridges, i.e., the cyan ink cartridge 13, the magenta ink cartridge 14 and the yellow ink cartridge 15, are recognized as "INK-EMPTY".

When it is determined, based on the counts C, M, Y read out in step 120, that all of the cyan, magenta and yellow ink cartridges 13-15 are "INK-EMPTY" cartridges, an affirmative decision YES is made in step 210.

In this case, the ink in any of the cyan, magenta and yellow ink cartridges 13-15 is not ejected. Thus, the same processing as implemented in steps 111, 112 in the first embodiment is implemented in steps 111, 112 in the flowchart of FIG. 6A. Namely, a droplet of the black ink in the black ink cartridge 16 is ejected from the inkjet head 10*a* onto the recording medium P at the recording position that is on the inner side of the outline of the solid black portion F, in this case. Thus, in the recording medium P, the recording position in question is printed black with the black ink.

On the other hand, when one or two of the cyan, magenta and yellow ink cartridges 13-15 is not "INK-EMPTY", a negative decision NO is made in step 210 and the processing flow goes to step 211 to determine an ink to be used in addition to the black ink. The determination of step 211 is made such that at least one ink other than the ink(s) determined to be "INK-EMPTY" is selected to be used. It is noted that when a plurality of inks are selected in step 211 to be used for forming black dots on the inner side of the outline, in addition to the black ink, the selected inks are used according to a predetermined rule, in the same way as in step 202 described above.

For instance, let us assume that in step 200 it is determined that only the cyan ink cartridge 13 is "INK-EMPTY". In such a specific example, at least one of the magenta and yellow inks is selected to be used. Then, the processing flow goes to step 212 to perform printing with the black ink and one of the at least one selected ink that is not "INK-EMPTY". How this selection of step 200 is made and how the selected ink(s) is/are used in step 212 accord to predetermined rules, as described above.

Thus, a droplet of the black ink and a droplet of one of the at least one selected ink that is not "INK-EMPTY" are ejected in series at the recording position on the inner side of the outline.

When the G/A 55 receives the first sort of recording data instructing printing using the black ink and a third sort of recording data instructing printing using one of the at least one selected ink that is not "INK-EMPTY", which is the magenta and yellow inks in this specific example, a relevant counter 55*a*-55*c*, in this example one of the M counter 55*b* and the Y counter 55*c*, responds to the third sort of recording data, namely, increments its count M or Y by one. The rest of the processing flow according to the second embodiment is identical with that according to the first embodiment.

As described above, when a solid black portion F in an image is recorded on the recording medium P according to the second embodiment, among the cyan, magenta and yellow inks in the respective ink cartridges 13-15, only the ink(s), the remaining amount of which is not less than the predetermined threshold, is used or ejected to print black an inner side of an outline of the solid black portion F.

Thus, the ink the remaining amount of which is less than the predetermined threshold is not used but the ink the remaining amount of which is not less than the predetermined threshold is used to print the inner side of the outline of the solid black portion F, whereby the remaining amounts of the cyan, magenta and yellow inks are made uniform. The other part of the effect and operation of the second embodiment is identical with those of the first embodiment.

Figure 6B:
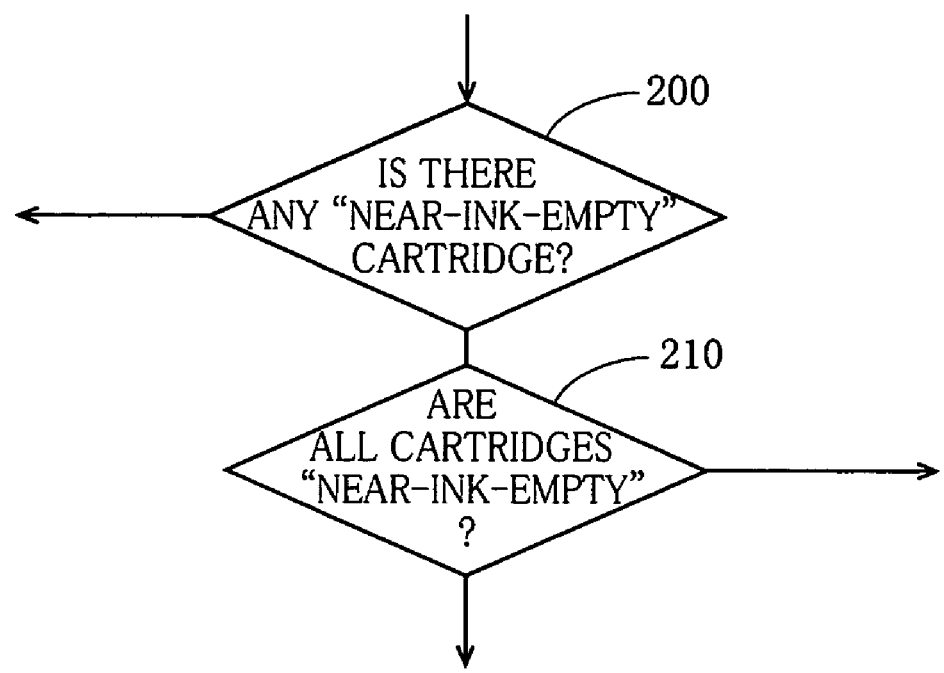
FIG. 6B is a flowchart illustrating recording processing implemented by a CPU in an inkjet recording apparatus according to a modified form of the second embodiment of the invention.

Referring now to FIG. 6B, there will be described a modified form of the second embodiment. In the modified form, steps 200 and 201 differ from the corresponding steps according to the second embodiment.

More specifically, in the second embodiment, at least one ink cartridge, the ink in which is to be used for forming a black dot on the inner side of the outline, is selected in step 201, 211 from at least one ink cartridge that is/are not determined to be "INK-EMPTY" in step 200, 210. In the modified form of the second embodiment, on the other hand, in step 201, 211 the selection of the at least one ink cartridge the ink in which is to be used for forming a black dot on the inner side of the outline is made from at least one ink cartridge that is/are not determined to be "NEAR-INK-EMPTY" in step 200, 210. An ink cartridge is recognized as "NEAR-INK-EMPTY" when a remaining amount of an ink in the ink cartridge is decreased below a threshold that is set at a level higher than the threshold used in the determination of the "INK-EMPTY" cartridge. When any of the cyan, magenta and yellow ink cartridges is recognized as a "NEAR-INK-EMPTY" cartridge, the ink in the "NEAR-INK-EMPTY" cartridge is not used for forming a black dot on an inner side of an outline of a black portion F, where the color of the ink is not required to be prominent, and instead is reserved for forming dots of other colors than black, where the color of the ink is important.

Figure 6C:
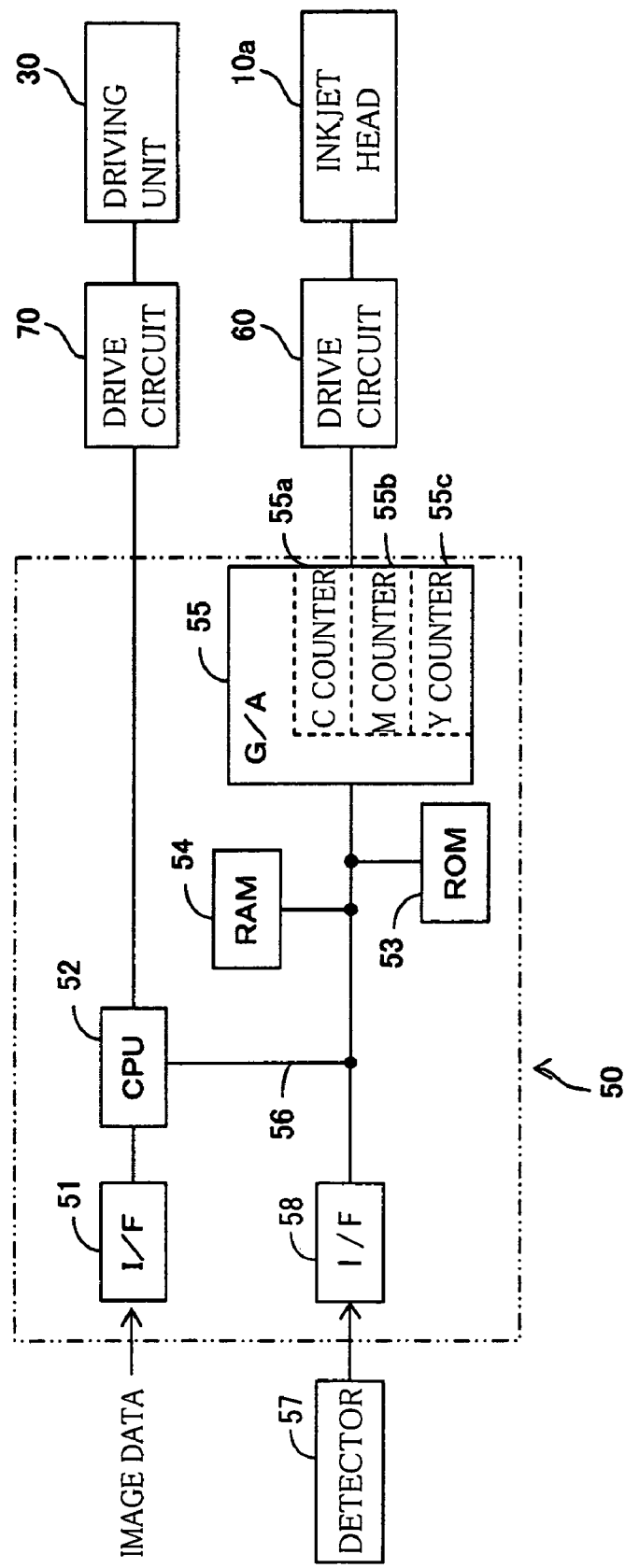
FIG. 6C is a block diagram of an electrical circuit in the inkjet recording apparatus according to the modified form of the second embodiment.

For instance, the determination of the "NEAR-INK-CARTRIDGE" may be made by means of a known detector 57 (shown in FIG. 6C), which is connected to the bus line 56 via an interface 58, in order to detect a remaining amount of an ink in each of four ink cartridges to find a "NEAR-INK-EMPTY" cartridge before an "INK-EMPTY" is determined using the C, M, Y counters 55a-55c. That is, in order to make more accurate the determination or estimation of the remaining amounts of the inks in the ink cartridges based on the counts C, M, Y, as described above with respect to the first embodiment, the detector 57 is used to detect that an ink remaining in an ink cartridges is consumed down to a level of "NEAR-INK-EMPTY" that is higher than the "INK-EMPTY" level, and then the counters 55a-55c are started to count the number of times of ejection of ink droplets. For instance, an optical detector is used as such a detector 57, as disclosed in JP-A-2002-292890 corresponding to U.S. Pat. No. 6,616,255A.

The other part of the modified form of the second embodiment is identical with the second embodiment.

The above-mentioned conventional method where upon the detector detects that an ink cartridge becomes "NEAR-INK-EMPTY", a corresponding counter 55a-55c is started to increment the count C, M, Y to determine that the ink cartridge becomes "INK-EMPTY" from a result of estimation based on the count C, M, Y, may be employed in each of the first embodiment and the third embodiment described below. That is, in each of the first and third embodiments, the counter 55a-55c may not be started to increment its count C, M, Y from the beginning of use of the corresponding ink cartridge, but may be started only when the remaining amount of the ink in the ink cartridge is decreased down to the level of "NEAR-INK-EMPTY" so that after the detection of the "NEAR-INK-EMPTY" state, the remaining amount of the ink in the ink cartridge is obtained by estimation based on the count C, M, Y.

Third Embodiment

Figure 7:
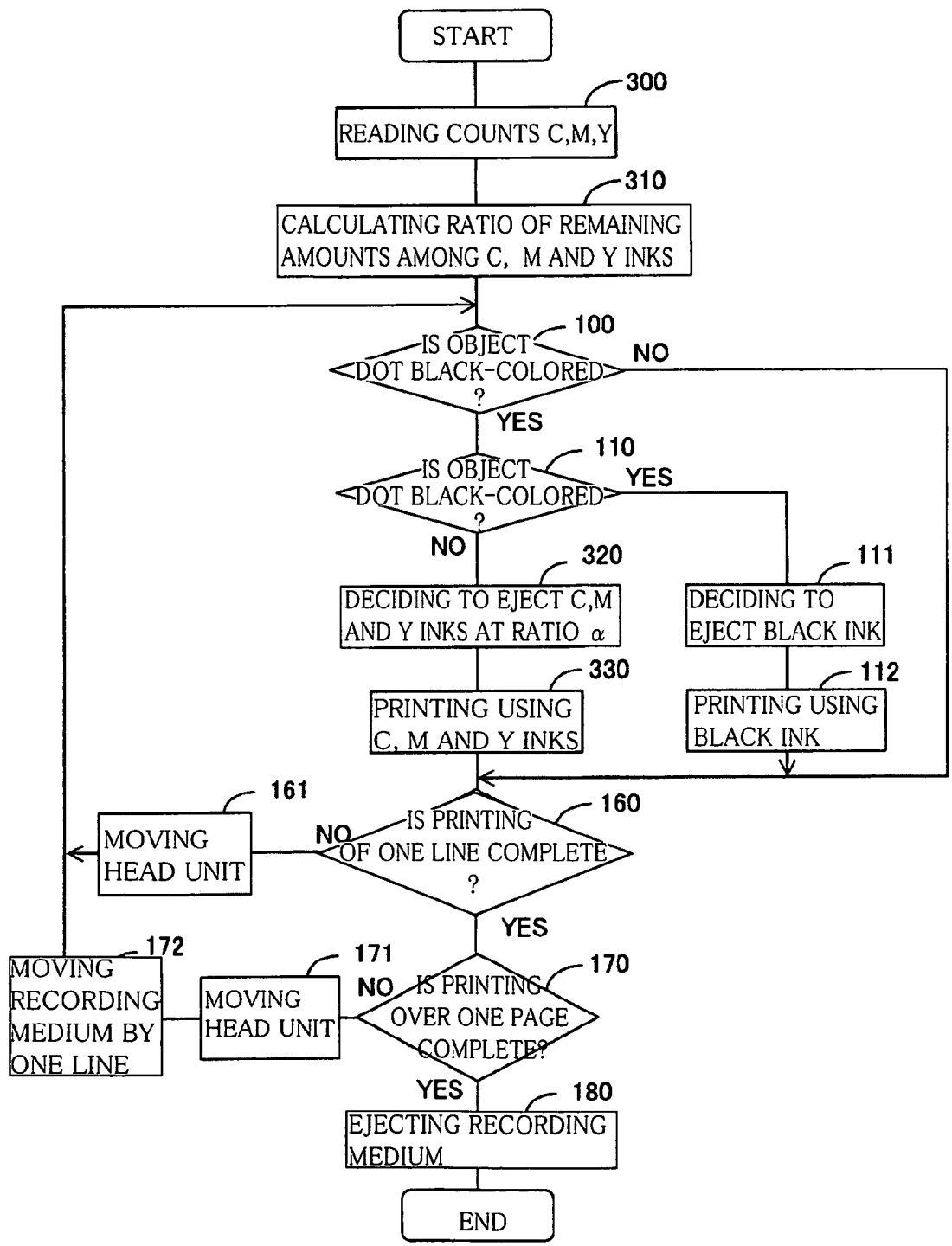
FIG. 7 is a flowchart illustrating recording processing implemented by a CPU in an inkjet recording apparatus according to a third embodiment of the invention.

There will be now described an inkjet recording apparatus according to a third embodiment of the invention, with reference to FIG. 7 illustrating an important part of the inkjet recording apparatus of the third embodiment. The inkjet recording apparatus of the third embodiment is different from that of the first embodiment only in the processing flow shown in FIG. 4. That is, instead of the flowchart of FIG. 4, the third embodiment implements a recording operation according to a flowchart of FIG. 7, but the other part of the apparatus of the third embodiment is identical with that of the first embodiment. The parts or elements corresponding to those of the first embodiment will be designated by the same reference numerals or symbols and description thereof is omitted.

When the inkjet recording apparatus of the third embodiment is operated to record an image, a CPU 52 initiates execution of a program according to the flowchart illustrated in FIG. 7.

The processing flow begins with step 300 in which the CPU 52 reads out counts C, M, Y from a C counter 55a, a M counter 55b and a Y counter 55c of a G/A 55.

The processing flow then goes to step 310 to calculate a ratio among remaining amounts of cyan, magenta, and yellow inks respectively accommodated in a cyan ink cartridge 13, a magenta ink cartridge 14 and a yellow ink cartridge 15, based on the counts C, M and Y read in step 300. Hereinafter, this ratio will be referred to as "remainder ratio α".

For instance, when the ratio among the amount of the cyan ink remaining in the cyan ink cartridge 13, the amount of the magenta ink remaining in the magenta ink cartridge 14, and the amount of the yellow ink remaining in the yellow ink cartridge 15 are 3:2:1, the remainder ratio α=3:2:1.

Then, steps 100 and 110 are implemented in the same way as in steps 100, 110 in the flowchart of FIG. 4 of the first embodiment. When an affirmative decision YES is made in both steps 100, 110, namely, when it is determined in step 110 that an object dot is on an outline of a solid black portion F in an image, the processing flow goes to steps 111, 112 to implement the same processing as in the corresponding steps in the first embodiment.

That is, a droplet of a black ink in the black ink cartridge 16 is ejected from an inkjet head 10a onto the recording medium P at a recording position that is on the inner side of the outline of the solid black portion F. Thus, in the recording medium P, the recording position is printed black with the black ink.

When it is determined in the above-described step 110 that the object dot is not on the outline, a negative decision NO is made and the processing flow goes to step 320 to decide to use the cyan, magenta and yellow inks in the cyan ink cartridge 13, the magenta ink-cartridge 14 and the yellow ink cartridge 15. That is, it is decided to eject droplets of the cyan, magenta and yellow inks at the remainder ratio α, as described in detail below.

In the following step 330, printing using the three inks in addition to the black ink is performed. That is, the black dot as the object dot is formed by first ejecting a droplet of the black ink, and then ejecting a droplet of one of the cyan, magenta and yellow inks at the same recording position as the droplet of the black ink on the inner side of the outline. Image data is provided in units of dot data for 16 dots in a matrix of four dots by four dots. The one of the cyan, magenta and yellow inks ejected on the black dot on the inner side of the outline is determined according to a suitably predetermined rule, such that a ratio among the numbers of dots formed with the cyan, magenta and yellow inks, respectively, along with the black ink, in each unit matrix corresponds to the remainder ratio α.

When the G/A 55 receives a first sort of recording data instructing to eject a droplet of the black ink and one of a second to fourth sorts of recording data respectively instructing to eject a droplet of the cyan, magenta and yellow ink, a relevant one of the C counter 55a, M counter 55b and Y counter 55c of the G/A 55 responds to the recording data instructing to eject a droplet of the cyan, magenta or yellow ink, namely, increments its count C, M or Y by one. The rest of the processing flow according to the third embodiment is identical with that of the first embodiment.

As described above, according to the third embodiment, in printing the inner side of the outline of the solid black portion F, the cyan, magenta and yellow inks are used such that the ratio among the numbers of dots formed with the cyan, magenta and yellow inks, along with the black ink, in each unit matrix corresponds to the remainder ratio α. Hence, the remaining amount is made further uniform among the cyan, magenta and yellow inks. The other part of the effect and operation of the third embodiment is identical with those of the first embodiment.

In each of the above-described embodiments, a combination of a pigmented ink (the black ink) and a dye ink (the cyan, magenta or yellow ink) are used to print the inner side of the outline of the solid black portion F. However, each embodiment may be modified such that two dye inks (i.e., a black dye ink, and a dye ink of cyan, magenta or yellow) are used to print the inner side of the outline.

According to this modified embodiment, the outline of the solid black portion F is printed with high sharpness, and the inner side of the outline of the black portion F is printed using the two dye inks so that a dot formed with each of the two dye inks spreads or grows upon landing on the recording medium P, while the remaining amount is made uniform among the cyan, magenta and yellow inks, as well as the remaining amount is made relatively uniform among the black pigmented ink, the black dye ink, and the cyan, magenta and yellow dye inks.

In each of the first to third embodiments, the black ink is employed as a first ink with which the outline of the solid black portion F is printed, and also as a second ink with which the inner side of the solid black portion F is printed along with at least one of the cyan, magenta and yellow inks as a third ink. However, this is not essential. That is, the first ink used to print the outline of the solid black portion F and the second ink used to print the inner side of the solid black portion F along with the third ink should be of a same color which may not be black.

Further, although in each of the first to third embodiments, a yellow ink, a cyan ink, and a magenta ink are employed as the third ink with which the inner side of the outline of the solid black portion F is printed along with the black ink as the second ink, this is not essential. That is, the same effect and operation as those of each of the first to third embodiments can be obtained as long as the third ink, with which the inner side of the outline of a solidly filled portion is printed along with the second ink, is of a color brighter than the color of the first ink and the second ink used to print the outline and the inner side thereof. For instance, the invention may be carried out such that a first ink used to print an outline of a solidly filled portion in an image, and a second ink used to print the inner side of the outline, are of a blue color, and a third ink used to print the inner side of the outline along with the blue ink as the second ink is of a color brighter than the blue color, e.g., a light blue. For another instance, the first and second inks are of a red color, and the third ink is of a pink color.

Although there have been described several embodiments of the invention, it is to be understood that the invention is not limited to the details of the embodiments, but may be otherwise embodied with various modifications and improvements that may occur to those skilled in the art, without departing from the scope and spirit of the invention defined in the appended claims.

What is claimed is:

1. A method for recording a solidly filled portion in an image using an inkjet recording apparatus, the method comprising the steps of:
   generating recording data based on mono-colored image data of the solidly filled portion;
   recording an outline of the solidly filled portion, based on the recording data, with a first ink of a first color;
   recording at least one first area of the solidly filled portion, based on the recording data, on an inner side of the outline with a second ink of the first color; and
   recording at least one second area of the solidly filled portion, based on the recording data, on the inner side of the outline with a third ink of a second color which is brighter than the first color, at least a part of the second area overlapping the first area, wherein all parts of the outline of the solidly filled portion are recorded only with the first ink.

2. The method according to claim 1, wherein the first and second inks are pigmented inks, and the third ink is a dye ink.

3. The method according to claim 1, wherein the first ink is a pigmented ink, and the second and third inks are dye inks.

4. The method according to claim 1, wherein the first color is black, and the second color is other than black.

5. The method according to claim 1, wherein the first and second inks are pigmented inks, the third ink is a dye ink, the first color is black, and the second color is other than black.

6. The method according to claim 1, wherein a black pigmented ink is used as the first and second inks, and at least one of cyan, magenta and yellow inks is selectively used as the third ink.

7. The method according to claim 1, wherein the inkjet recording apparatus comprises a first recording portion, a second recording portion and a third recording portion that respectively have a first nozzle, a second nozzle and a third nozzle, wherein
   the step of recording the outline of the solidly filled portion comprises ejecting the first ink from the first recording portion,
   the step of recording the at least one first area of the solidly filled portion comprises ejecting the second ink from the second recording portion, and
   the step of recording the at least one second area of the solidly filled portion comprises ejecting the third ink from the third recording portion.

8. The method according to claim 7, wherein the first recording portion and the first nozzle serve as the second recording portion and the second nozzle such that
   the step of recording the outline of the solidly filled portion comprises ejecting a droplet of the first ink from the first nozzle, and
   the step of recording the at least one first area of the solidly filled portion comprises ejecting a droplet of the first ink as the second ink from the first nozzle.

9. The method according to claim 8, wherein
   the step of recording the outline of the solidly filled portion further comprises ejecting a droplet of a black pigmented ink from the first nozzle,
   the step of recording the at least one first area of the solidly filled portion further comprises ejecting a droplet of the black pigmented ink from the first nozzle serving as the second nozzle, and
   the step of recording the at least one second area of the solidly filled portion further comprises ejecting a droplet of a dye ink of a color other than black from the third nozzle of the third recording portion.

10. The method according to claim 7, wherein the inkjet recording apparatus comprises a plurality of third ink tanks accommodating inks of respective colors as the third ink and a plurality of the third recording portions, to which the inks accommodated in the third ink tanks are supplied, and wherein
    the step of recording the at least one second area of the solidly filled portion further comprises the step of selectively operating at least one of the third recording portions based on remaining amounts of the inks in the third ink tanks.

11. The method according to claim 10, wherein the step of selectively operating at least one of the third recording portions further comprises estimating the remaining amount of the ink in each of the third ink tanks based on summation of the number of times droplets of the ink have been ejected.

12. The method according to claim 11, wherein the step of selectively operating at least one of the third recording portions further comprises detecting that the remaining amount of the ink in any of the third ink tanks lowers down to a threshold before estimating the remaining amount of ink in each of the third ink tanks.

13. The method according to claim 11, wherein the step of selectively operating at least one of the third recording portions further comprises operating the third recording portion supplied by the one of the third ink tanks containing the largest remaining amount of ink.

14. The method according to claim 10, wherein the step of selectively operating at least one of the third recording portions is based on a ratio corresponding to the remaining amounts of the inks in the third ink tanks.

15. The method according to claim 10, wherein the step of recording the at least one second area of the solidly filled portion further comprises selecting at least one third recording portion to be operated when a remaining amount of ink is larger than a threshold.

16. The method according to claim 15, wherein the step of selectively operating at least one of the third recording portions further comprises detecting that the remaining amount of the ink in any of the third ink tanks lowers down to the threshold.

17. The method according to claim 1, wherein the mono-colored image data of the solidly filled portion is image data of a solid black portion.

* * * * *